US012668546B2

(12) United States Patent
Lyu

(10) Patent No.: US 12,668,546 B2
(45) Date of Patent: Jun. 30, 2026

(54) METHOD FOR IMPROVING Bs OF MnZn POWER FERRITE MATERIAL BY MOVING VALLEY POINT

(71) Applicant: HENGDIAN GROUP DMEGC MAGNETICS CO., LTD., Dongyang (CN)

(72) Inventor: Donghua Lyu, Dongyang (CN)

(73) Assignee: HENGDIAN GROUP DMEGC MAGNETICS CO., LTD., Dongyang (CN)

( * ) Notice: Subject to any disclaimer, the term of this patent is extended or adjusted under 35 U.S.C. 154(b) by 1077 days.

(21) Appl. No.: 17/778,430

(22) PCT Filed: Jul. 15, 2020

(86) PCT No.: PCT/CN2020/101991
§ 371 (c)(1),
(2) Date: May 20, 2022

(87) PCT Pub. No.: WO2021/098243
PCT Pub. Date: May 27, 2021

(65) Prior Publication Data
US 2022/0411335 A1      Dec. 29, 2022

(30) Foreign Application Priority Data

Nov. 20, 2019    (CN) .......................... 201911144085.X

(51) Int. Cl.
*C04B 35/26*          (2006.01)
*C04B 35/64*          (2006.01)
(52) U.S. Cl.
CPC .......... *C04B 35/2658* (2013.01); *C04B 35/64* (2013.01); *C04B 2235/3208* (2013.01); *C04B 2235/3244* (2013.01); *C04B 2235/3275* (2013.01); *C04B 2235/3293* (2013.01)
(58) Field of Classification Search
CPC ... C04B 35/64; C04B 35/265; C04B 35/2658; C04B 35/6262; C04B 35/62685; C04B 35/62695; C04B 2235/96; C04B 2235/602; C04B 2235/3208; C04B 2235/3244; C04B 2235/3262; C04B 2235/3275; C04B 2235/3284; C04B 2235/3293; H01F 41/02; H01F 41/344; H01F 41/0246
See application file for complete search history.

(56) References Cited

U.S. PATENT DOCUMENTS

2002/0096665 A1    7/2002  Kobayashi et al.

FOREIGN PATENT DOCUMENTS

| CN | 102503397 | A | * | 6/2012 |
| CN | 102693802 | A | * | 9/2012 |
| CN | 102693803 | A | * | 9/2012 |
| CN | 104402424 | A | | 3/2015 |
| CN | 102693807 | B | * | 4/2015 |
| CN | 102751065 | B | * | 10/2015 |
| CN | 105461296 | A | | 4/2016 |
| CN | 106396661 | A | * | 2/2017 |
| CN | 106587979 | A | | 4/2017 |
| CN | 107399965 | A | * | 11/2017 |
| CN | 107459344 | A | | 12/2017 |
| CN | 107935579 | A | | 4/2018 |
| CN | 108863339 | A | | 11/2018 |
| CN | 111362684 | A | | 7/2020 |

OTHER PUBLICATIONS

CN106396661A_English Translation Description, Chen et. al. "Manganese zinc ferrite material with wide temperature and low power as well as preparation method thereof", Espacenet Oct. 25, 2025, Feb. 5, 2017, Year 2017 (Year: 2017).*
CN102503397A "Manganese oxide doped manganese-zinc ferrite and preparation method thereof", Xinjiang, Espacenet Oct. 20, 2025, Jun. 20, 2012, Year 2012 (Year: 2012).*
CN102693803A_English_Translation_Description Feiyu et. al. "Wide-temperature and low-loss MnZn power ferrite and preparation method thereof", Espacenet Oct. 20, 2025, Sep. 26, 2012 Year 2012 (Year: 2012).*
CN107399965A_English_Translation_Description, Hao "MnZn ferrite with wide temperature range and high current", Espacenet Oct. 22, 2025, Nov. 17, 2017 Year 2017 (Year: 2017).*

(Continued)

*Primary Examiner* — Alison L Hindenlang
*Assistant Examiner* — Christopher Paul Daigler
(74) *Attorney, Agent, or Firm* — Bayramoglu Law Offices LLC

(57)          ABSTRACT

A method for improving the Bs of an MnZn power ferrite material by moving the valley point includes the following steps: 1) mixing $Fe_2O_3$, MnO and ZnO, and performing primary sanding; 2) adding glue, performing spraying and granulating, and then performing pre-sintering to obtain a pre-sintered material; 3) adding additives to the pre-sintered material, and performing secondary sanding; and 4) adding glue to the secondary sanded material, performing spraying and granulating, pressing into a standard ring, and then performing sintering. The method controls and moves the valley point, reduces loss and improves the Bs of a material by controlling the $Fe_2O_3$ content and the $Co_2O_3$ content, and the method is relatively simple and suitable for industrialization.

6 Claims, No Drawings

(56) References Cited

OTHER PUBLICATIONS

CN102751065B English Description Translation, "Wide-temperature broadband low-loss MnZn power ferrite material and preparation method thereof", Zhong et, al. Oct. 28, 2015 Espacenet Apr. 2, 2026 (Year: 2015).*

CN102693802A English Description Translation, "Wide-temperature MnZn power ferrite material and preparation method thereof", Donghua et. al, Sep. 26, 2012 Espacenet Apr. 2, 2026 (Year: 2012).*

CN102693807B English Translation Description,"Ultra-wide-temperature, low-loss and high-magnetic-flux-density MnZn power ferrite and preparation method thereof" Feiyu et. al. Apr. 8, 2015 Espacenet Apr. 2, 2026 (Year: 2015).*

* cited by examiner

METHOD FOR IMPROVING Bs OF MnZn POWER FERRITE MATERIAL BY MOVING VALLEY POINT

CROSS REFERENCE TO THE RELATED APPLICATIONS

This application is the national phase entry of International Application No. PCT/CN2020/101991, filed on Jul. 15, 2020, which is based upon and claims priority to Chinese Patent Application No. 201911144085.X, filed on Nov. 20, 2019, the entire contents of which are incorporated herein by reference.

TECHNICAL FIELD

The present invention relates to the field of preparation of MnZn power ferrite materials, and in particular relates to a method for improving the saturation flux density (Bs) of an MnZn power ferrite material by moving the valley point.

BACKGROUND

The existing MnZn power ferrite materials move the valley point in such a way that it is generally believed that the loss valley point with a high $Fe_2O_3$ content in the main formula moves to low temperature, the loss valley point with a low $Fe_2O_3$ content moves to high temperature, or the valley point is moved by controlling the $Fe_2O_3$ content and ZnO content, to reduce the ZnO content and improve the Bs of an MnZn power ferrite material. In the prior art, the valley point is moved depending on the $Fe_2O_3$ content, which will increase high temperature loss or decrease the Bs. If the $Fe_2O_3$ content is high, the valley point will move to low temperature, and the loss will increase at high temperature, especially at higher than 100° C. However, reducing the $Fe_2O_3$ content will reduce the Bs of the material. The technology of moving the valley point by controlling the $Fe_2O_3$ content and ZnO content, and improving the Bs of an MnZn power ferrite material by reducing the ZnO content will increase loss of the material. Therefore, under the conditions of the prior art, it is contradictory and impossible to simultaneously improve the Bs, reduce loss and move the valley point, because the essence of the prior art is to control the movement of the valley point by means of the $Fe_2O_3$ content and ZnO content.

For example, in "A method for controlling the valley point of a manganese-zinc ferrite powder with a wide temperature and low temperature coefficient" disclosed in a Chinese patent document, with a publication number CN107935579A, a method for accurately controlling the valley point of a manganese-zinc ferrite powder with a wide temperature and low temperature coefficient during research, development and mass production of products is disclosed. The manganese-zinc ferrite powder includes main components and additives, wherein the main components include $Fe_2O_3$, ZnO and $Mn_3O_4$; the weight percentage of the ZnO in the main components is 4-9 wt %; the weight percentage of the $Fe_2O_3$ in the main components is calculated according to the formula $Fe_2O_3$ (wt %)=72.88 A*ZnO (wt %); when the valley point is controlled at 80° C., the A value is 0.2278; when the valley point is controlled at 90° C., the A value is 0.2313; and when the valley point is controlled at 100° C., the A value is 0.2358. However, the present invention controls the valley point by means of the $Fe_2O_3$ content and ZnO content in the main formula, does not involve how to reduce loss, improve the Bs and other issues, and will increase loss of a material when controlling the valley point by the method.

SUMMARY

The present invention is to overcome the problems including that the technology of moving the valley point by controlling the $Fe_2O_3$ content and ZnO content in the main formula, and improving the Bs of an MnZn power ferrite material by reducing the ZnO content will increase loss of the material, and provides a method for improving the Bs of an MnZn power ferrite material by moving the valley point.

To achieve the above objectives, the present invention adopts the following technical solutions:

A method for improving the Bs of an MnZn power ferrite material by moving the valley point, including the following steps:

1) mixing $Fe_2O_3$, MnO and ZnO, and performing primary sanding;

2) adding glue, performing spraying and granulating, and then performing pre-sintering to obtain a pre-sintered material;

3) adding additives to the pre-sintered material, and performing secondary sanding; and 4) adding glue to the secondary sanded material, performing spraying and granulating, pressing into a standard ring, and then performing sintering.

Preferably, the proportions of the components in step 1) are as follows: 52.9-53.3 mol % of $Fe_2O_3$, 38.3-39.08 mol % of MnO, and 7.62-8.8 mol % of ZnO.

Preferably, the additives in step 3) include the following components in mass percentages accounting for the pre-sintered material: 0.03-0.08 wt % of $CaCO_3$, 0.015-0.04 wt % of $ZrO_2$, 0.43-0.52 wt % of $Co_2O_3$, and 0.05-0.2 wt % of $SnO_2$.

By adjusting the ratio of the $Fe_2O_3$ content to the $Co_2O_3$ content, the present invention moves the valley point to high temperature, increases the Bs and reduces high temperature loss.

The principle of the present invention is that the valley point of a material is influenced by the relationship between the magnetocrystalline anisotropy constant K1 and temperature, and the valley point of the material lies where K1 is 0. In the main formula of the present invention, the proportions of $Fe_2O_3$, MnO and ZnO should be controlled in a certain range, because when the $Fe_2O_3$ content in the main formula is higher than 53.3 mol %, the eddy current loss of the material will increase, and when the $Fe_2O_3$ content is less than 52.9 mol %, $Fe_2O_3$ cannot effectively reduce the magnetocrystalline anisotropy constant K1 of the material in synergy with $Co_2O_3$. Moreover, relative to the total weight of the main formula, the $Co_2O_3$ content in the present invention must be in a range of 0.43%-0.52%, because when the $Co_2O_3$ content is lower than 0.43%, increasing the $Fe_2O_3$ content will move the valley point to low temperature, and when the $Co_2O_3$ content is higher than 0.52%, the loss of the material will increase, mainly because excessive $Co_2O_3$ will increase the magnetocrystalline anisotropy constant K2 of the material, resulting in an increase in the loss. Therefore, on the basis of the original formula, including the additives, by increasing the $Fe_2O_3$ content of the original formula, the $Co_2O_3$ content is controlled at 0.43%-0.52% relative to the total weight of the main formula, so that the valley point can be moved to high temperature to reduce high temperature loss and improve the Bs of the material. This is contrary to the general belief in the prior art that when the $Fe_2O_3$ content is increased, the valley point moves to low temperature, and when the $Fe_2O_3$ content is reduced, the valley point moves to high temperature.

In the prior art, when K1 is 0, the relationship between K1 and temperature is controlled by controlling the $Fe_2O_3$ content or the ratio of $Fe_2O_3$ to ZnO, that is, by adjusting the $Fe_2O_3$ content or controlling the ratio of $Fe_2O_3$ to ZnO to move the valley point, and it is impossible to move the valley point, reduce loss and improve the Bs of a material simultaneously. Although the prior art also takes into account the adjustment using $Co_2O_3$ in terms of moving the valley point, in the prior art, it is believed that addition of $Co_2O_3$ will cause the valley point definitely to move to low temperature. Therefore, in the prior art, $Co_2O_3$ is usually considered to be helpful to move the valley point to the low temperature, and is beneficial to reduce loss at room temperature. Therefore, the amount of $Co_2O_3$ added is not big, and is generally controlled to be 0.35 wt % or less of the total weight of the pre-sintered material. The prior art does not take into account that when the amount of $Co_2O_3$ is within a certain range, the valley point will move oppositely, that is, increase in the $Fe_2O_3$ content causes the valley point to move to high temperature.

Preferably, the material-to-ball-to-water ratio in the primary sanding and the secondary sanding is 1:5-7:0.4-0.6, and the sanding time is 0.5-1.5 h.

Under this condition of proportioning, the sanding effect is more uniform.

Preferably, the glue added in step 2) accounts for 10% of the total mass of the material to be pre-sintered and has a mass fraction of 7.5%.

Preferably, the pre-sintering in step 2) is performed in a rotary kiln at 900-1000° C.

Preferably, the glue added in step 3) accounts for 10% of the total mass of the secondary sanded material and has a mass fraction of 7.5%.

Preferably, the pressing pressure in step 4) is 6-8 Mpa.

Therefore, the present invention has the following beneficial effects: The present invention controls and moves the valley point, reduces loss and increases the Bs of a material by controlling the $Fe_2O_3$ content and the $Co_2O_3$ content, so that the problem in the prior art that it is impossible to simultaneously move the valley point, reduce the loss and improve the Bs of the material is solved, and the method of the present invention is relatively simple and suitable for industrialization.

DETAILED DESCRIPTION OF THE EMBODIMENTS

The present invention will be further described below in conjunction with specific embodiments.

Embodiment 1: A method for improving the Bs of an MnZn power ferrite material by moving the valley point, includes the following steps:

1) 52.9 mol % of $Fe_2O_3$, 38.3 mol % of MnO and 8.8 mol % of ZnO were mixed, and sanded for the first time for 1.5 h in a material-to-ball-to-water ratio of 1:5:0.4;

2) glue accounting for 10% of the total mass of the material to be pre-sintered and having a mass fraction of 7.5% was added, and the material to be pre-sintered was sprayed and granulated, and then pre-sintered at 900° C. in a rotary kiln to obtain the pre-sintered material;

3) additives including the following components in mass percentages accounting for the pre-sintered material, namely 0.03% of $CaCO_3$, 0.04% of $ZrO_2$, 0.44% of $Co_2O_3$, and 0.05% of $SnO_2$, were added to the pre-sintered material, and then, the pre-sintered material was sanded for the second time for 1.5 h at a material-to-ball-to-water ratio of 1:5:0.4; and 4) glue accounting for 10% of the total mass of the secondary sanded material and having a mass fraction of 7.5% was added to the secondary sanded material, and the secondary sanded material was sprayed, granulated, pressed into a standard ring at 6 Mpa and then sintered.

Embodiment 2: A method for improving the Bs of an MnZn power ferrite material by moving the valley point, includes the following steps:

1) 53.3 mol % of $Fe_2O_3$, 39.08 mol % of MnO and 7.62 mol % of ZnO were mixed, and sanded for the first time for 0.5 h in a material-to-ball-to-water ratio of 1:7:0.6;

2) glue accounting for 10% of the total mass of the material to be pre-sintered and having a mass fraction of 7.5% was added, and the material to be pre-sintered was sprayed and granulated, and then pre-sintered at 1000° C. in a rotary kiln to obtain the pre-sintered material;

3) additives including the following components in mass percentages accounting for the pre-sintered material, namely 0.03% of CaCO3, 0.04% of ZrO2, 0.48% of $Co_2O_3$, and 0.05% of SnO2, were added to the pre-sintered material, and then, the pre-sintered material was sanded for the second time for 0.5 h at a material-to-ball-to-water ratio of 1:7:0.6; and 4) glue accounting for 10% of the total mass of the secondary sanded material and having a mass fraction of 7.5% was added to the secondary sanded material, and the secondary sanded material was sprayed, granulated, pressed into a standard ring at 8 Mpa and then sintered.

Embodiment 3: A method for improving the Bs of an MnZn power ferrite material by moving the valley point, includes the following steps:

1) 53.1 mol % of $Fe_2O_3$, 38.5 mol % of MnO and 8.4 mol % of ZnO were mixed, and sanded for the first time for 1 h in a material-to-ball-to-water ratio of 1:6:0.5;

2) glue accounting for 10% of the total mass of the material to be pre-sintered and having a mass fraction of 7.5% was added, and the material to be pre-sintered was sprayed and granulated, and then pre-sintered at 950° C. in a rotary kiln to obtain the pre-sintered material;

3) additives including the following components in mass percentages accounting for the pre-sintered material, namely 0.03% of CaCO3, 0.04% of ZrO2, 0.52% of $Co_2O_3$, and 0.05% of $SnO_2$, were added to the pre-sintered material, and then, the pre-sintered material was sanded for the second time for 1 h at a material-to-ball-to-water ratio of 1:6:0.5; and 4) glue accounting for 10% of the total mass of the secondary sanded material and having a mass fraction of 7.5% was added to the secondary sanded material, and the secondary sanded material was sprayed, granulated, pressed into a standard ring at 7 Mpa and then sintered.

Comparative example 1: A method for improving the Bs of an MnZn power ferrite material by moving the valley point, includes the following steps:

1) 52.6 mol % of $Fe_2O_3$, 38.6 mol % of MnO and 8.8 mol % of ZnO were mixed, and sanded for the first time for 1.5 h in a material-to-ball-to-water ratio of 1:5:0.4;

2) glue accounting for 10% of the total mass of the material to be pre-sintered and having a mass fraction of 7.5% was added, and the material to be pre-sintered was sprayed and granulated, and then pre-sintered at 900° C. in a rotary kiln to obtain the pre-sintered material;

3) additives including the following components in mass percentages accounting for the pre-sintered material, namely 0.03% of $CaCO_3$, 0.04% of $ZrO_2$, 0.44% of $Co_2O_3$, and 0.05% of $SnO_2$, were added to the pre-sintered material, and then, the pre-sintered material was sanded for the second time for 1.5 h at a material-to-ball-to-water ratio of 1:5:0.4; and 4) glue accounting for 10% of the total mass of the secondary sanded material and having a mass fraction of 7.5% was added to the secondary sanded material, and the secondary sanded material was sprayed, granulated, pressed into a standard ring at 6 Mpa and then sintered.

Comparative example 2: A method for improving the Bs of an MnZn power ferrite material by moving the valley point, includes the following steps:

1) 53.3 mol % of $Fe_2O_3$, 39.08 mol % of MnO and 7.62 mol % of ZnO were mixed, and sanded for the first time for 0.5 h in a material-to-ball-to-water ratio of 1:7:0.6;

2) glue accounting for 10% of the total mass of the material to be pre-sintered and having a mass fraction of 7.5% was added, and the material to be pre-sintered was sprayed and granulated, and then pre-sintered at 1000° C. in a rotary kiln to obtain the pre-sintered material;

3) additives including the following components in mass percentages accounting for the pre-sintered material, namely 0.03% of $CaCO_3$, 0.04% of $ZrO_2$, 0.35% of $Co_2O_3$, and 0.05% of $SnO_2$, were added to the pre-sintered material, and then, the pre-sintered material was sanded for the second time for 0.5 h at a material-to-ball-to-water ratio of 1:7:0.6; and 4) glue accounting for 10% of the total mass of the secondary sanded material and having a mass fraction of 7.5% was added to the secondary sanded material, and the secondary sanded material was sprayed, granulated, pressed into a standard ring at 8 Mpa and then sintered.

Comparative example 3: A method for improving the Bs of an MnZn power ferrite material by moving the valley point, includes the following steps:

1) 53.5 mol % of $Fe_2O_3$, 38.9 mol % of MnO and 7.6 mol % of ZnO were mixed, and sanded for the first time for 1 h in a material-to-ball-to-water ratio of 1:6:0.5;

2) glue accounting for 10% of the total mass of the material to be pre-sintered and having a mass fraction of 7.5% was added, and the material to be pre-sintered was sprayed and granulated, and then pre-sintered at 950° C. in a rotary kiln to obtain the pre-sintered material;

3) additives including the following components in mass percentages accounting for the pre-sintered material, namely 0.03% of $CaCO_3$, 0.04% of $ZrO_2$, 0.52% of $Co_2O_3$, and 0.05% of $SnO_2$, were added to the pre-sintered material, and then, the pre-sintered material was sanded for the second time for 1 h at a material-to-ball-to-water ratio of 1:6:0.5; and 4) glue accounting for 10% of the total mass of the secondary sanded material and having a mass fraction of 7.5% was added to the secondary sanded material, and the secondary sanded material was sprayed, granulated, pressed into a standard ring at 7 Mpa and then sintered.

The valley point and Bs of the MnZn power ferrite materials prepared in the Embodiments and Comparative examples are tested, and the data obtained are shown in the table below.

TABLE 1

| Test data of Embodiments and Comparative examples | | | | | | |
|---|---|---|---|---|---|---|
| | Pcv (kW/m³) 100 kHz 200 mT 8218 test | | | | Bs (mT) 1194 A/m 50 Hz | |
| | 25° C. | 80° C. | 100° C. | 120° C. | 25° C. | 100° C. |
| Embodiment 1 | 290 | 280 | 275 | 320 | 545 | 430 |
| Comparative example 1 | 260 | 275 | 310 | 360 | 535 | 421 |
| Embodiment 2 | 325 | 280 | 285 | 310 | 550 | 438 |
| Comparative example 2 | 290 | 310 | 330 | 390 | 550 | 436 |
| Embodiment 3 | 335 | 285 | 295 | 305 | 545 | 439 |
| Comparative example 3 | 380 | 370 | 360 | 380 | 550 | 435 |

From the above table, Embodiment 1 and Comparative example 1 are different in the $Fe_2O_3$ content and same in the $Co_2O_3$ content. In Embodiment 1, the $Fe_2O_3$ content is high, but the valley point moves to high temperature, and in Comparative example 1, the $Fe_2O_3$ content is low, but the valley point moves to low temperature, which are caused by addition of certain amounts of $Co_2O_3$. Also, when the $Fe_2O_3$ content is high, the Bs is high.

Embodiment 2 and Comparative example 2 are only different in the $Co_2O_3$ content. The $Co_2O_3$ content in Comparative example 2 is not within the range of the present invention. Therefore, when the $Fe_2O_3$ content is high, the valley point moves to low temperature.

Comparing Embodiment 3 with Comparative example 3, Comparative example 3 exceeds the range of the present invention in the $Fe_2O_3$ content and ZnO content, and has higher loss.

What is claimed is:

1. A method for improving saturation flux density (Bs) of an MnZn power ferrite material by moving a valley point, comprising the following steps:

1) mixing $Fe_2O_3$, MnO and ZnO, and performing a primary sanding to obtain a first sanded material, wherein the proportions of the components are 52.9-53.3 mol % of $Fe_2O_3$, 38.3-39.08 mol % of MnO, and 7.62-8.8 mol % of ZnO;

2) adding a glue to the first sanded material, performing a first spraying and a first granulating to obtain a material to be pre-sintered, and then performing a pre-sintering to obtain a pre-sintered material;

3) adding additives to the pre-sintered material, and performing a secondary sanding to obtain a secondary sanded material, wherein the additives consist of the following components in mass percentages accounting for the pre-sintered material: 0.03-0.08 wt % of $CaCO_3$, 0.015-0.04 wt % of $ZrO_2$, 0.43-0.52 wt % of $Co_2O_3$, and 0.05-0.2 wt % of $SnO_2$; and 4) adding the glue to the secondary sanded material, performing a second spraying and a second granulating, pressing into a standard ring, and then performing sintering.

2. The method for improving the Bs of the MnZn power ferrite material by moving the valley point according to claim 1, wherein in step 1 and step 3, a material-to-ball-to-water ratio in the primary sanding and the secondary sanding is 1:5-7:0.4-0.6, and a sanding time is 0.5-1.5 h.

3. The method for improving the Bs of the MnZn power ferrite material by moving the valley point according to claim 1, wherein the glue added in step 2) accounts for 10% of a total mass of the material to be pre-sintered and the glue has a mass fraction of 7.5%.

4. The method for improving the Bs of the MnZn power ferrite material by moving the valley point according to claim 1, wherein the pre-sintering in step 2) is performed in a rotary kiln at 900-1000° C.

5. The method for improving the Bs of the MnZn power ferrite material by moving the valley point according to claim 1, wherein the glue added in step 4) accounts for 10% of a total mass of the secondary sanded material and the glue has a mass fraction of 7.5%.

6. The method for improving the Bs of the MnZn power ferrite material by moving the valley point according to claim 1, wherein a pressing pressure in step 4) is 6-8 Mpa.

* * * * *